United States Patent

Hoffman

[15] 3,678,396

[45] July 18, 1972

[54] SIGNAL THRESHOLD CROSSING COUNTER EMPLOYING MONOSTABLE MULTIVIBRATOR TO SUPPRESS EXTRANEOUS CROSSING INDICATIONS

[72] Inventor: Harold Henry Hoffman, Holmdel, N.J.

[73] Assignee: Bell Telephone Laboratories Incorporated, Murray Hill, N.J.

[22] Filed: July 28, 1970

[21] Appl. No.: 58,859

[52] U.S. Cl. .......... 325/474, 325/322, 325/323, 325/324, 325/325, 325/477, 325/373, 328/165, 328/167, 329/128

[51] Int. Cl. .......... H04b 1/10

[58] Field of Search .......... 325/300, 321–326, 325/342, 371, 373, 374, 377, 387, 388, 473, 474, 479, 42, 56, 65, 301, 477, 478; 324/78 F; 328/162–165, 167, 112, 138; 329/126, 128; 307/235, 295

[56] References Cited

UNITED STATES PATENTS

| | | | |
|---|---|---|---|
| 3,166,678 | 1/1965 | Fleshman et al. | 325/473 |
| 3,387,221 | 6/1968 | Arberman et al. | 325/323 |
| 3,465,253 | 9/1969 | Rittenbach | 325/324 |
| 3,214,700 | 10/1965 | Hook | 325/323 |
| 3,555,434 | 1/1971 | Sheen | 328/112 |
| 3,555,438 | 1/1971 | Ragsdales | 328/165 |

*Primary Examiner*—Albert J. Mayer
*Attorney*—R. J. Guenther and William L. Keefauver

[57] ABSTRACT

This specification describes a signal threshold crossing counter in which extraneous threshold crossing indications caused by high frequency noise signals accompanying an intelligence signal are suppressed by time domain filtering of the crossing indications. This time domain filtering is accomplished by means of an inhibiting or blocking monostable multivibrator having an internal time constant intermediate the period of intelligence signal threshold crossings and the period of the accompanying noise signals.

3 Claims, 2 Drawing Figures

INVENTOR
H.H. HOFFMAN
BY Gerald E. Murphy
ATTORNEY

PATENTED JUL 18 1972 3,678,396

SIGNAL THRESHOLD CROSSING COUNTER EMPLOYING MONOSTABLE MULTIVIBRATOR TO SUPPRESS EXTRANEOUS CROSSING INDICATIONS

BACKGROUND OF THE INVENTION

1. Field of the Invention

This invention relates to signal threshold crossing counters and particularly to threshold crossing counters for use in counting threshold crossings of signals contaminated by noise. The disclosed apparatus is of particular application where bands of intelligence and noise signals are very close to one another in frequency and where it is therefore difficult or impossible to eliminate the noise signals by conventional frequency domain filtering. The invention has proved particularly useful in counting fades (i.e., significant decreases in signal level) in the envelope signals of mobile radio transmission systems. Fluctuations in received signal amplitude occur during mobile radio communications because of the motion of the mobile station through the spatial standing-wave pattern resulting from interaction of direct and reflected signals.

2. Description of the Prior Art

In the design and installation of such systems it is essential to study the phenomenon of signal fading in order to evaluate antenna types, receiver types, transmission paths, and the like. Such statistical information as the average root-mean-square (RMS) power level, the number of fades at any signal level or a given time interval, the signal level range over which significant fades occur, and the number of deep disabling fades to be expected at critical low signal levels are all used to judge mobile radio systems.

Much of the information needed for the above-mentioned analyses can be derived from accurate counts of envelope signal level threshold crossing due to signal fades. By establishing a series of thresholds at a range of threshold levels, counts can be obtained which indicate both the number and severity of signal fades during a given period of time. It is not, however, possible simply to count threshold crossings without regard for the other properties of the waveforms since low-amplitude, high-frequency noise signals accompanying the envelope signals may erroneously increase threshold crossing counts by a factor of ten or more. The counts are erroneous because threshold crossings due to such noise are not indications of the fading phenomenon. Conventional frequency domain filtering is only satisfactory to eliminate noise components having frequencies significantly higher than the frequency of fades, thus leaving a residue of noise in the frequency band immediately above the intelligence band. In the past the required counting of fades has therefore been done by visual inspection of envelope signal traces. Counts have also been derived by computer analysis of digitized signal traces. Both of these methods are unsatisfactory, the visual method requires too much time and the computer method is of low accuracy. Moreover, neither method can be used in real time.

It is therefore an object of this invention to provide apparatus capable of performing accurate, real-time threshold crossing counts of signals contaminated by noise.

It is another object of this invention to provide, in a threshold crossing counter, apparatus for filtering out unwanted threshold crossing indications.

It is yet another object of this invention to perform time domain filtering of binary signals.

It is a further object of this invention to simulate by time domain filtering a low pass frequency domain filter with an extremely sharp cut-off.

SUMMARY OF THE INVENTION

These and other objects of this invention are accomplished, in accordance with the principles of the invention, by providing a signal threshold crossing counter having one or more channels each set to detect crossings of a unique threshold level and each responsive to only one signal threshold crossing in a predetermined interval of time. More particularly, each channel of the threshold crossing counter of this invention has a threshold detector arranged to produce an output signal indicative of whether an applied signal (e.g., a mobile radio transmission envelope signal) is above or below a predetermined threshold level. The output signal of this threshold detector is used to trigger a one-shot multivibrator which has a predetermined internal time constant during which time it is insensitive to further changes in the threshold detector output signal. The time constant of the multivibrator is chosen to be intermediate the period of fades and the period of higher frequency noise perturbations contaminating the signal. A counter is arranged to count the D.C. level changes in the output signal of the multivibrator indicative of the triggering of the multivibrator. As a result of the unresponsiveness of the multivibrator to erroneously rapid succession of threshold crossings, true fades and not noise-induced threshold crossings are counted.

Further features and objects of this invention, its nature, and various advantages, will be more apparent upon consideration of the attached drawing and the following detailed description.

DETAILED DESCRIPTION OF THE INVENTION

Figure 1:
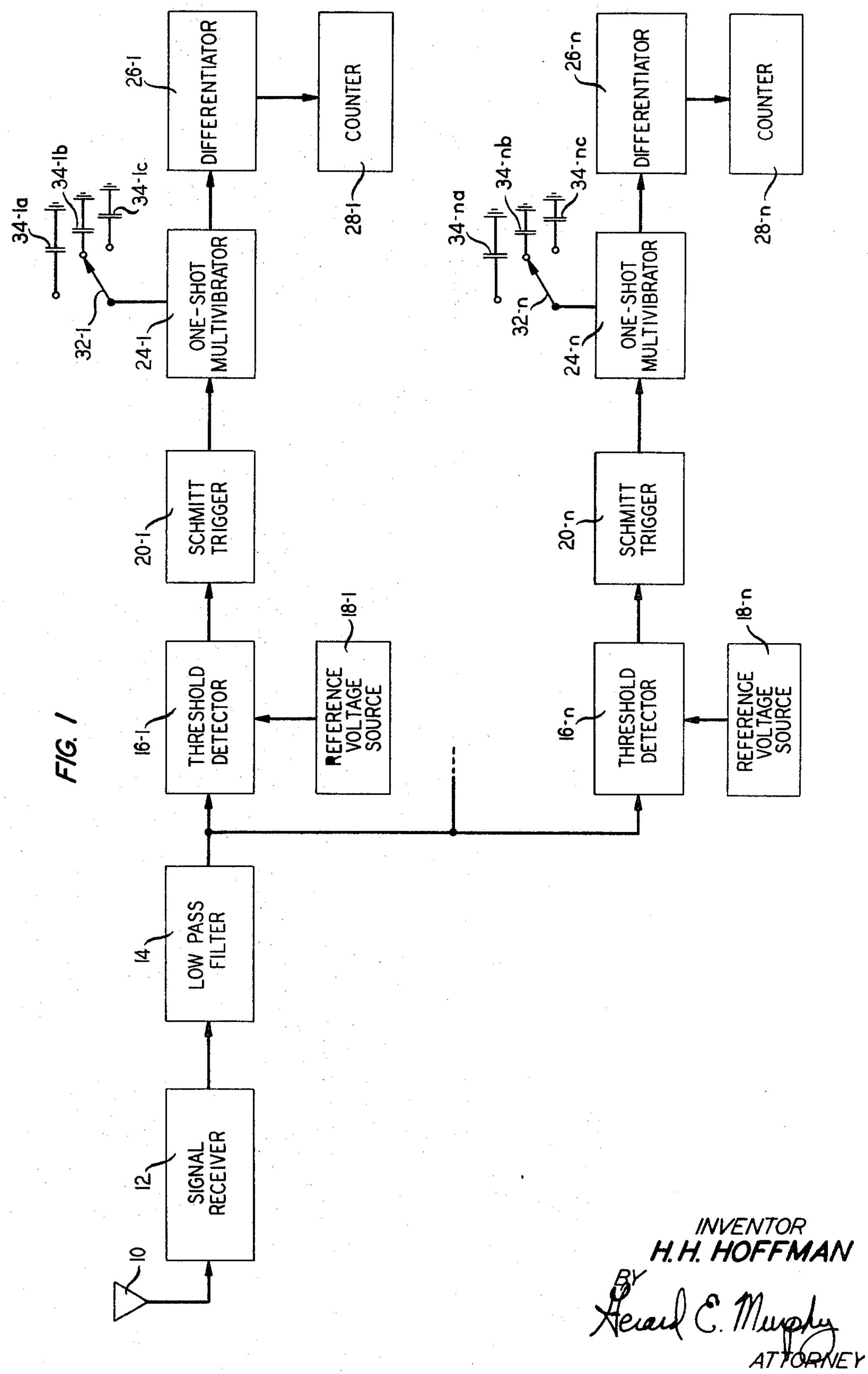
FIG. 1 is a block diagram of the signal threshold crossing counter of this invention.
Figure 2:
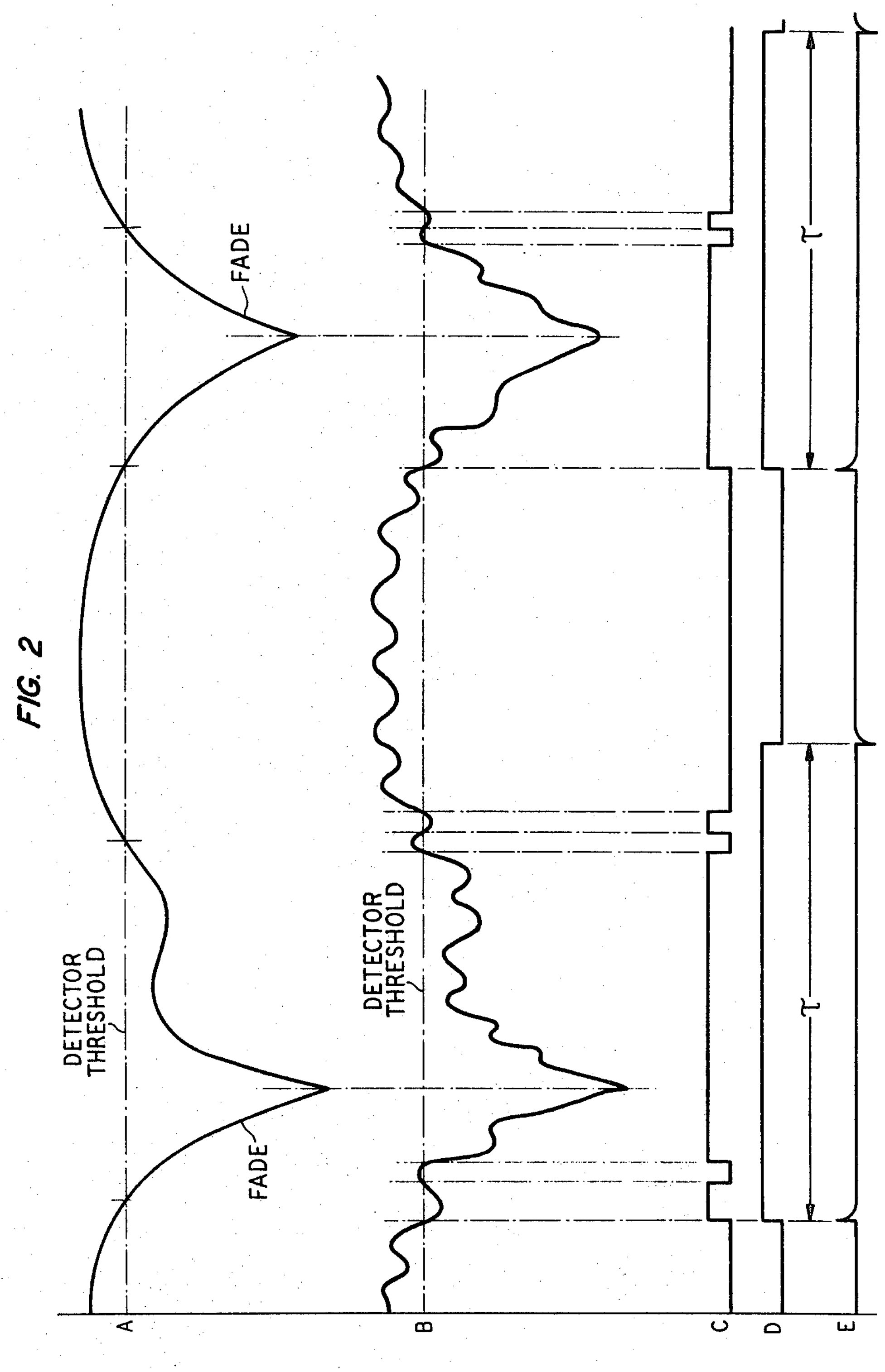
FIG. 2A depicts a typical fading envelope signal uncontaminated by noise signals.
FIG. 2B depicts the fading envelope signal of FIG. 2A contaminated by low-amplitude, high-frequency noise signals.
FIG. 2C depicts the signal produced by the threshold detector in one of the channels of the apparatus of FIG. 1 in the processing of the signal depicted by FIG. 2B.
FIG. 2D depicts the signal produced by the multivibrator in one of the channels of the apparatus of FIG. 1 in the processing of the signal depicted by FIG. 2B.
FIG. 2E depicts the signal produced by the differentiator in one of the channels of the apparatus of FIG. 1 in the processing of the signal depicted by FIG. 2B.

The threshold crossing counter of this invention may be used to count threshold crossings in signals from any desired signal source. When fades in the envelope of a received mobile radio transmission are to be counted, that source of signals may be an antenna 10 and a signal receiver 12 as shown in FIG. 1. In the apparatus of FIG. 1 the output of receiver 12 is a fluctuating or fading signal representative of the envelope of the received signal, a representative portion of which might be depicted as shown in FIG. 2A were the signal entirely free of noise signals. In practice, of course, such envelope signals are not free of noise. Rather, the smooth signal trace of FIG. 2A is highly idealized, the true signal trace being considerably roughened, i.e., degraded, by high-frequency, low-amplitude noise signals which contaminate the intelligence signal.

In order to eliminate some of the higher frequency noise signals, the signal from receiver 12 is passed through low pass filter 14. Filter 14 may be any conventional low pass filter, preferably with a variable pass band and a moderately sharp cutoff characteristic. Variability in the pass band of filter 14 is particularly desirable in apparatus to be used for counting mobile radio transmission signal fades since the characteristics of filter 14 can then be adjusted, as discussed below, to compensate for changes in vehicle speed, transmission frequency, and noise level. A filter with a 24 db per octave cutoff has been used with good result in counting mobile radio signal fades.

The cutoff frequency of filter 14 is determined by several factors, for example, the highest frequency of interest in the fading envelope or intelligence signal and the amount of noise present. As discussed by J. F. Ossanna, Jr. in an article titled "A Model for Mobile Radio Fading Due to Building Reflections: Theoretical and Experimental Fading Waveform Power Spectra," Bell System Technical Journal, Vol. XLIII, No. 6, pp. 2935–71, November 1964, there is a theoretical maximum fundamental fade rate given by $$f_m = 2V/\lambda_C \quad (1)$$

where $V$ is the vehicle speed and $\lambda_c$ is the transmitted carrier frequency wavelength. For transmission on a carrier frequency of 838 MHz and a vehicle speed of 15 MPH, for example, $f_m$ is 37.5 Hz. The cutoff frequency of low pass filter 14 cannot, however, be too close to $f_m$ since that would unduly limit the sharpness of deep, fast changing signal fades. Where $f_m$ is 37.5 Hz, for example, the cutoff frequency of low pass filter 14 may advantageously be approximately 120 Hz. As mentioned above, the choice of the cutoff frequency of low pass filter 14 may be further influenced by the amount of noise present.

In order to count the fades which depress the envelope signal below a predetermined threshold level, it is first necessary to generate a signal indicative of whether that envelope signal is above or below the threshold. Accordingly, the output signal from low pass filter 14 of FIG. 1 is applied to one or more threshold detectors 16–1 through **16–*n*, each of which is arranged to produce an output voltage of one value when the applied signal is above a predetermined reference or threshold voltage, established by one of reference voltage sources 18–1 through 18–*n*, and an output voltage of another value when the applied signal is below that reference voltage. Accordingly, threshold detectors 16–1 through 16–*n* may be any conventional threshold detectors with an output signal indicative of the polarity of an applied signal relative to a predetermined threshold level. The output signal of each of threshold detectors 16 is amplified and its resolution improved by applying it to a conventional Schmitt trigger device 20**.

It would now be possible to obtain a count of threshold crossings at each threshold level by differentiating the output signal of each of Schmitt triggers 20 to produce countable spike pulses and applying those spike pulses to electronic counters. This technique, however, would not produce an accurate count of threshold crossings due to signal fades. As depicted by FIG. 2B, the envelope signal passed by low pass filter 14 is still contaminated by noise signals, particularly from the band of frequencies above the fundamental fade rate $f_m$ but below the cutoff frequency of filter 14. Noise signals in that band are virtually impossible to eliminate. This is partly because of the limitations of conventional frequency domain filtering as performed by filter 14. Filters with extremely sharp cutoff characteristics are costly and cumbersome. Moreover, the choice of filter 14 reflects a compromise: the cutoff frequency of filter 14 cannot be too close to $f_m$ lest the properties of the intelligence signal be altered, particularly in deep, fast changing fades.

Accordingly, there are significantly more threshold crossings in the signal trace of FIG. 2B than there are signal fades. In particular, while there are only two true fades in the signal segment depicted in FIG. 2B, there are fully five downward signal threshold crossings. Assuming the "detector threshold" of FIG. 2B to be the level established by threshold detector 16–1 of FIG. 1, a count of these threshold crossings, as indicated by upward changes in the output signal, depicted in FIG. 2C, of Schmitt trigger 20–1 would not give an accurate count of true signal fades.

In accordance with the principles of this invention, the output signal of Schmitt trigger 20–1 is therefore applied to monostable multivibrator 24–1. As is typical of conventional monostable multivibrators, multivibrator 24–1 has a stable state and a quasi-stable state. The state of multivibrator 24–1 is indicated by the voltage of the signal at its output terminal. As is also typical, multivibrator 24–1 will remain in its stable state indefinitely. When triggered to its quasi-stable state by an increase in the voltage of the signal applied to it, however, it will remain in that state only for a predetermined period or interval of time $\tau$ which may be termed the internal time constant or period of the device. After the elapse of this predetermined time, multivibrator 24–1 automatically returns to its stable state. While in its triggered or quasi-stable state, multivibrator 24–1 is unaffected by changes in the signal applied to it (see, for example, *Waveforms*, edited by Britton Chance, et al., McGraw-Hill Book Company, 1949, page 572). In particular, multivibrator 24–1 is unaffected by any triggering pulses from Schmitt trigger 20–1. The time constant $\tau$ of multivibrator 24–1 is determined, as is well known, by which of timing capacitors 34–1 is connected to multivibrator 24–1 by switch 32–1.

By judicious choice of the time constant of multivibrator 24–1, threshold crossing indications in the output signal of Schmitt trigger 20–1 due to noise contaminating the signal passed by filter 14 can be suppressed. In particular, the time constant of multivibrator 24–1 is intermediate the expected period of signal fades and the period of contaminating noise signals. For $f_m = 37.5$, for example, noise signals at frequencies of 60 and 120 Hz. (having periods of 16.66... and 8.333... milliseconds, respectively) are particularly troublesome. With an $f_m$ of 37.5 Hz, the period of fades (the reciprocal of $f_m$) can be expected to be 26.66... milliseconds. Accordingly, with a time constant of about 24 milliseconds, multivibrator 24–1 acts as a unique gating filter or time domain filter to block or inhibit any erroneously rapid succession of signal threshold crossings in the vicinity of a threshold crossing produced by a true fade as shown in FIG. 2D. When the output signal of multivibrator 24–1 is applied as shown in FIG. 1 to a differentiating circuit 26–1, a signal like that depicted in FIG. 2E having countable spike pulses at the triggering and resetting of multivibrator 24–1 will be produced. By counting the spikes indicative of the triggering of multivibrator 24–1 (the positive-going spikes in FIG. 2E), an accurate account of envelope signal fades is obtained. Accordingly, the output signal of differentiator 26–1, with negative-going spikes clamped, is applied to counter 28–1 as shown in FIG. 1. Differentiator 26–1 may therefore be any conventional differentiating circuit, for example, a capacitor and resistor connected in series. Negative-going pulses produced by a differentiator such as this may be clamped by connecting a diode in parallel with the resistor to prevent charge accumulation of the undesired polarity on the capacitor. Counter 28–1 may be any suitable electronic counting device.

Although the operation of only the first of the *n* channels of the apparatus of FIG. 1 has been described in detail, it is to be understood that the remaining channels are similar in construction and operation to that first channel. Each channel, of course, has a unique predetermined threshold level.

As will now be clear, the choice of a time constant for multivibrators 24 intermediate the expected period of signal fades and the period of higher frequency unfiltered or unfilterable noise signals renders each of multivibrators 24 responsive to pass substantially all threshold crossings due to low frequency perturbations of the intelligence signal but unresponsive to threshold crossing indications due to unwanted signals of higher frequency. Accordingly, each of multivibrators 24 performs in the time domain a filtering operation which cannot be performed in the frequency domain. In particular, for an applied signal exhibiting a binary characteristic such as whether the signal is above or below a predetermined threshold level, high frequency signal perturbations may be filtered out in the manner discussed above. Moreover, because the filtering is binary and takes place in the time domain, the cutoff of the filter is extremely precise and very well defined. Thus, the effect of any perturbation having period less than the time constant of multivibrators 24 will be eliminated while perturbations having periods greater than the time constant of multivibrators 24 will be transmitted or passed on to counters 28.

It is to be understood that the embodiments shown and described herein are illustrative of the principles of this invention only, and that modifications may be implemented by those skilled in the art without departing from the spirit and scope of the invention. For example, rather than counting fades in an envelope signal, the apparatus of this invention may be readily adapted to counting positive-going pulses in an intelligence signal contaminated by noise.

What is claimed is:

1. Apparatus for determing the number and severity of fades in the intelligence component of an applied intelligence signal contaminated by noise perturbations of higher frequencies, comprising:

a signal filtering network responsive to said contaminated intelligence signal for attenuating the upper band of frequencies of said noise perturbations; and a plurality of threshold crossing counting channels responsive to said filtered contaminated intelligence signal, each channel counting the number of times the intelligence component of said filtered intelligence signal crosses a predetermined unique threshold voltage level, each channel including:

threshold detecting means for developing a signal indicative of whether said filtered intelligence signal is above or below the threshold level for said channel;

filtering means responsive to said signal developed by said threshold detecting means for developing a second signal having a first level when said filtered intelligence signal is indicated to be above said threshold level and having a second level for a predetermined interval of time, intermediate the periods of said intelligence signal and said noise perturbations, after said filtered intelligence signal is indicated to be below said threshold level; and means for counting the occurrences of said second level in said signal developed by said filtering means.

2. Apparatus as defined in claim 1 wherein said filtering means of each of said plurality of threshold crossing counting channels comprises a monostable multivibrator having a first stable state and a second quasi-stable state.

3. Apparatus for determining the number and severity of fades in the fading envelope of a received mobile radio transmission signal comprising:

means for producing an output signal representative of said fading envelope of said mobile radio transmission signal, said output envelope signal contaminated by higher frequency noise perturbations;

means for low pass filtering said contaminated output envelope signal to attenuate the upper band of said higher frequency noise perturbations; and a plurality of threshold crossing counting channels responsive to said filtered contaminated envelope signal, each channel counting the number of times said filtered envelope signal crosses a unique threshold voltage level, each of said channels further comprising:

a source of the threshold voltage for said channel;

a threshold detector for producing an output signal indicative of the polarity of said filtered contaminated envelope signal relative to said threshold voltage;

a trigger circuit for resolving said output signal of said threshold detector;

a monostable multivibrator for producing an output signal of a first level when said filtered contaminated envelope signal is indicated to be of one polarity relative to said reference voltage and an output signal of a second level for a predetermined interval of time after said filtered contaminated envelope signal is indicated to be of the other polarity relative to said reference voltage, said monostable multivibrator being insensitive to further changes in the polarity of said filtered contaminated envelope signal during said predetermined interval of time;

means for differentiating the output signal of said monostable multivibrator to produce an output signal having countable spike pulses at the changes from said first to said second levels in said output signal of said multivibrator; and means for counting said countable spike pulses.

* * * * *